Figure 1:
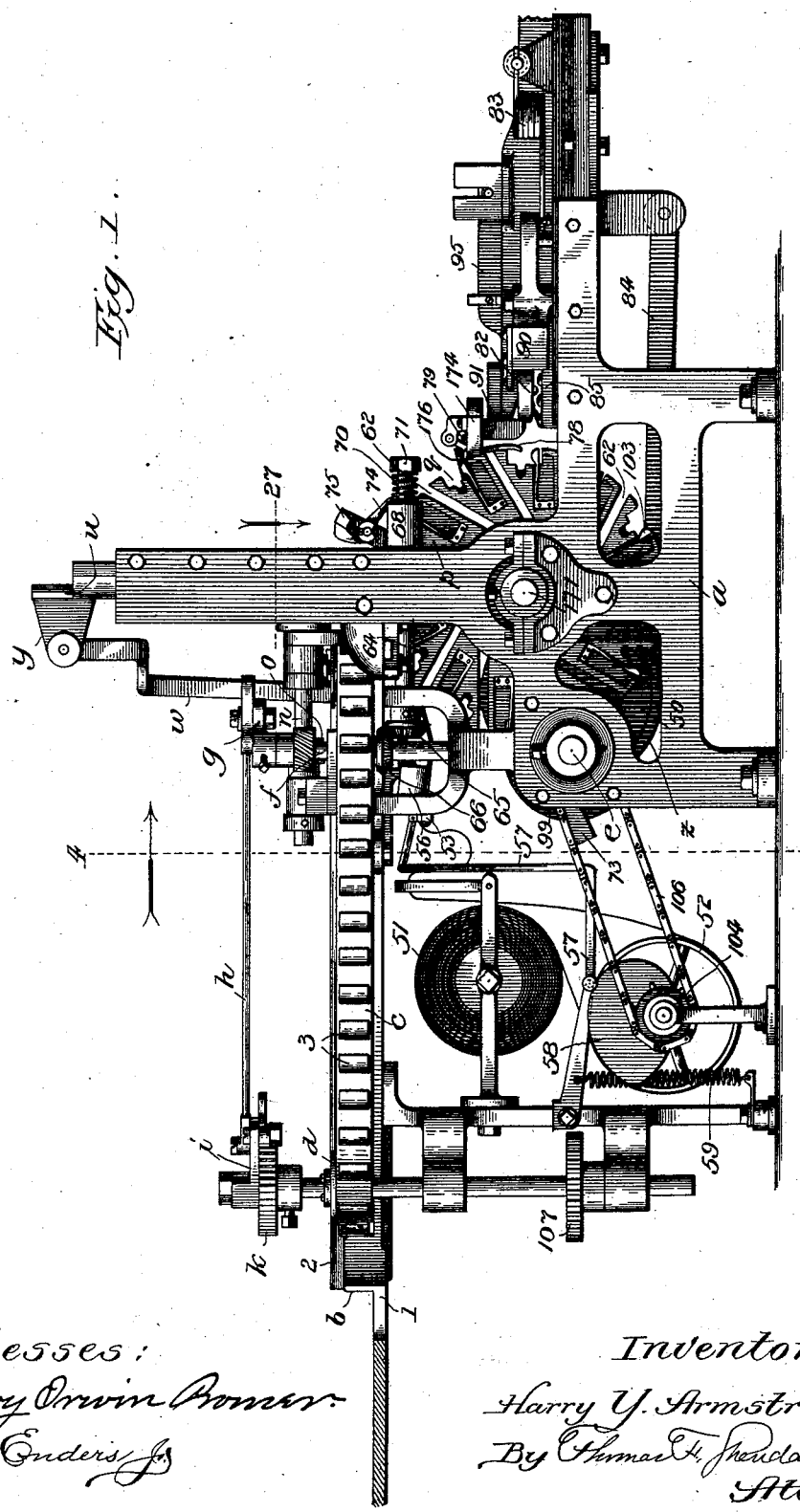

No. 715,739. Patented Dec. 16, 1902.
H. Y. ARMSTRONG.
MACHINE FOR CUTTING AND WRAPPING CARAMELS.
(Application filed Dec. 28, 1900.)
(No Model.) 18 Sheets—Sheet 1.

Witnesses:
Harry Orwin Bonner
John Enders Jr.

Inventor:
Harry Y. Armstrong,
By Thomas F. Sheridan
Att'y.

No. 715,739. Patented Dec. 16, 1902.
H. Y. ARMSTRONG.
MACHINE FOR CUTTING AND WRAPPING CARAMELS.
(Application filed Dec. 28, 1900.)

(No Model.) 18 Sheets—Sheet 3.

Witnesses:
Harry Irwin Cromer
John Enders Jr.

Inventor:
Harry Y. Armstrong
By Thomas F. Sheridan
Att'y.

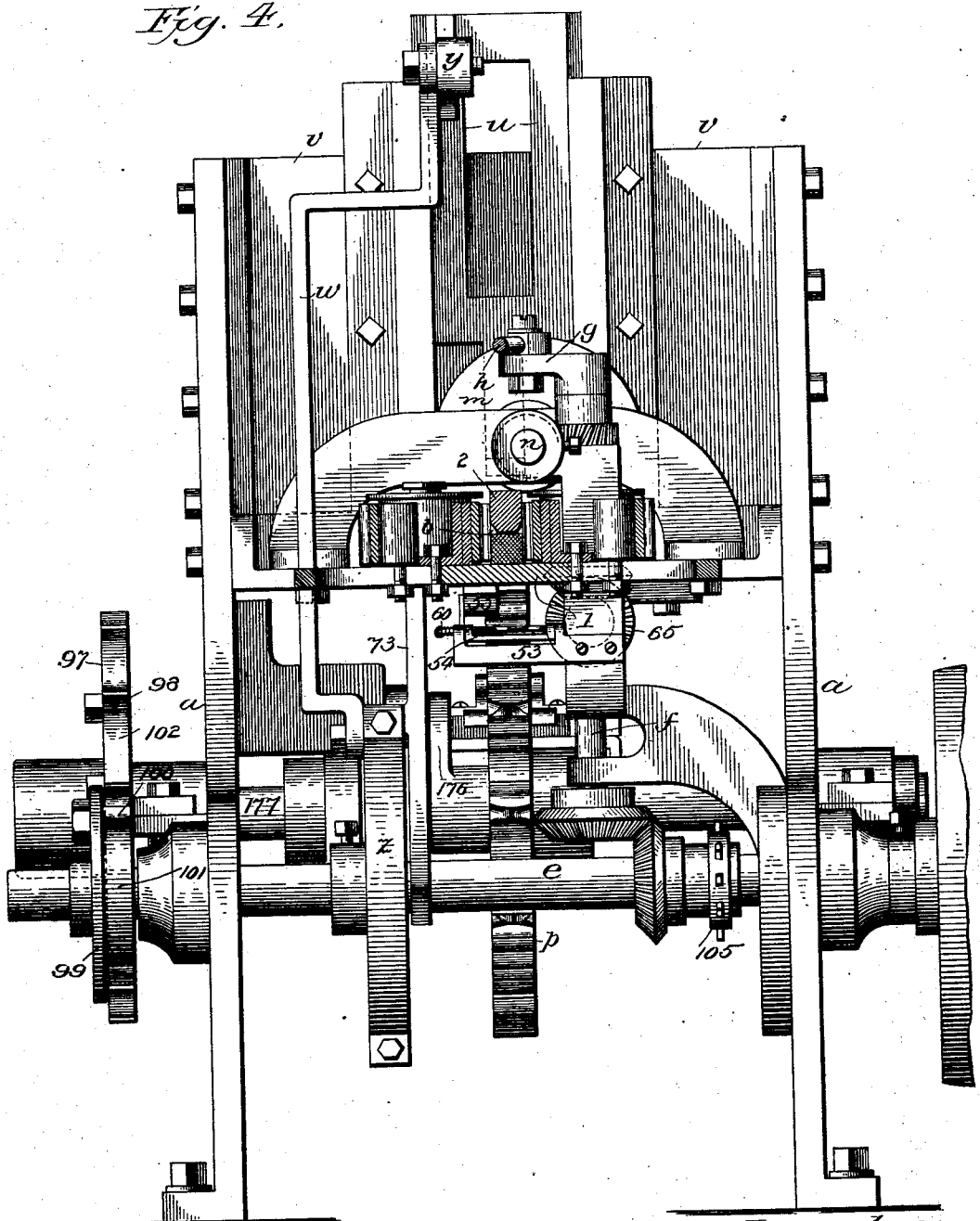

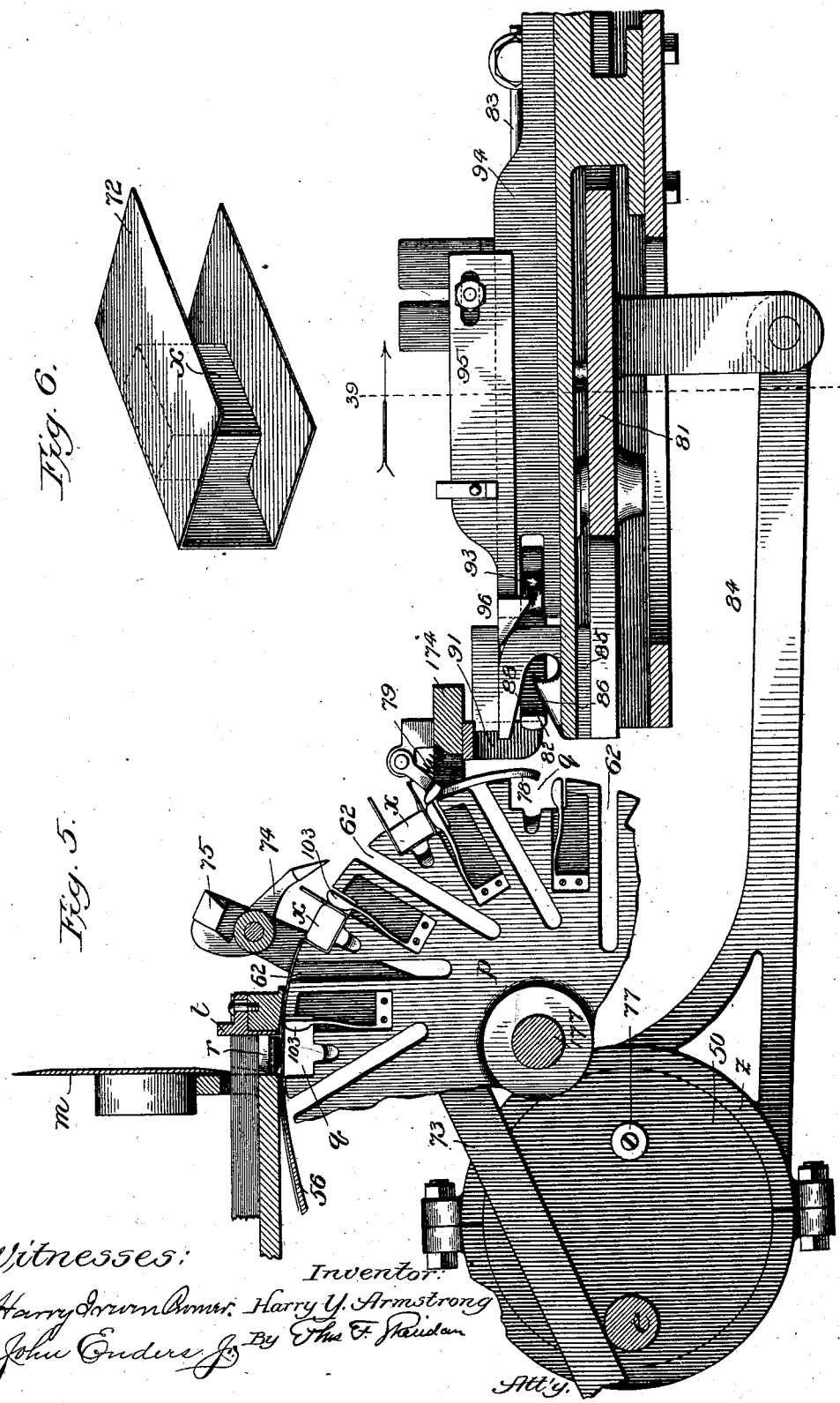

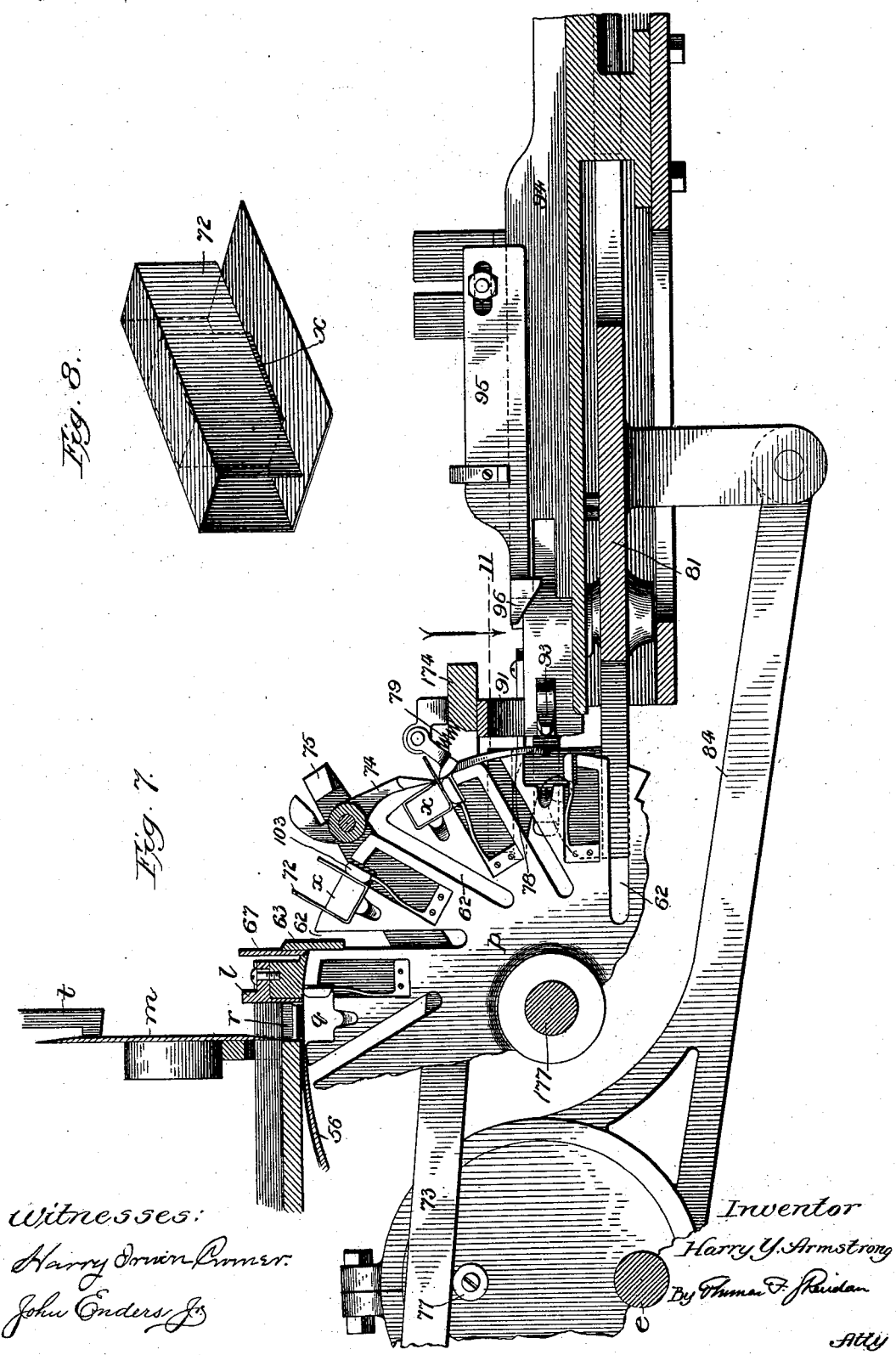

No. 715,739. Patented Dec. 16, 1902.
H. Y. ARMSTRONG.
MACHINE FOR CUTTING AND WRAPPING CARAMELS.
(Application filed Dec. 28, 1900.)
(No Model.) 18 Sheets—Sheet 7.
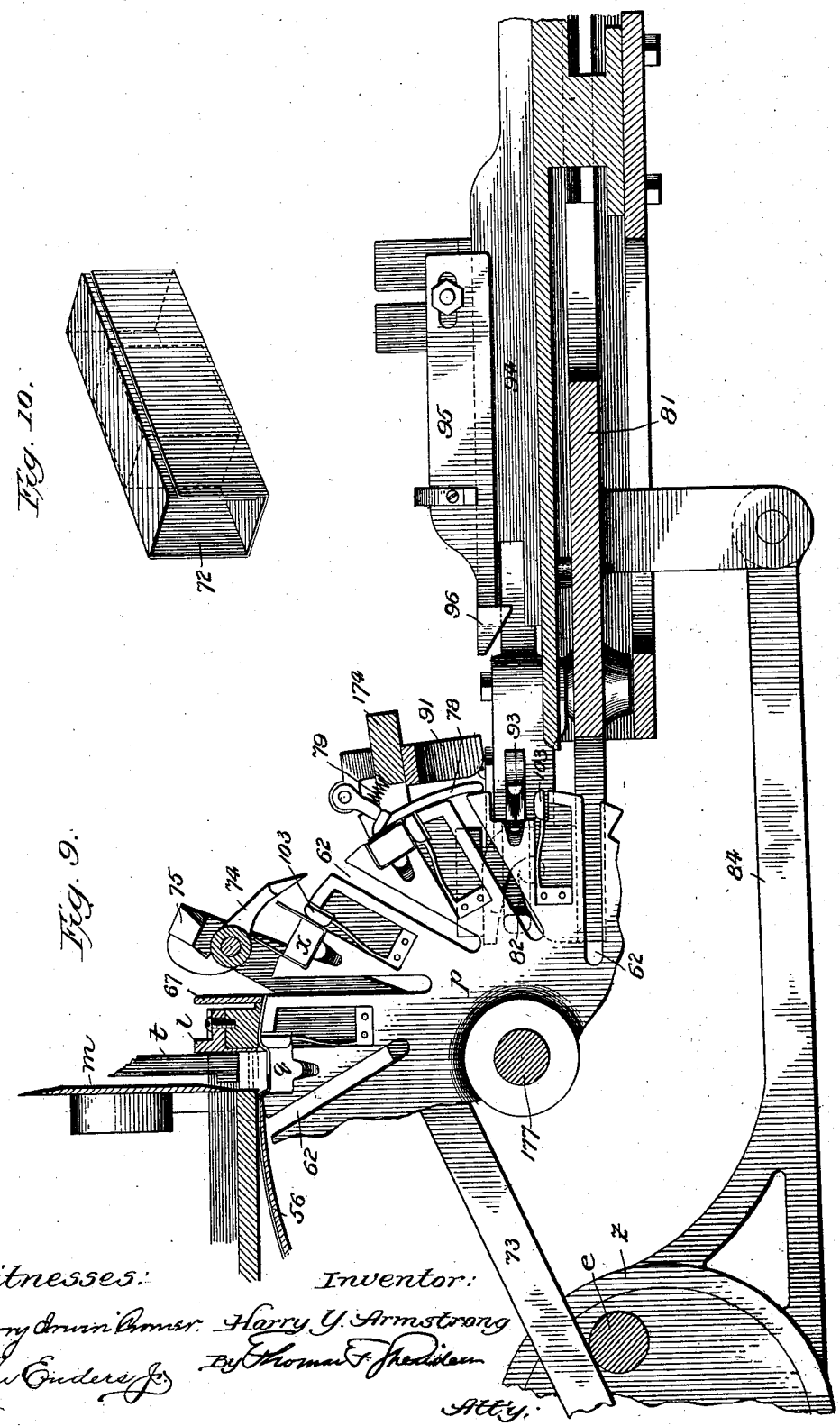

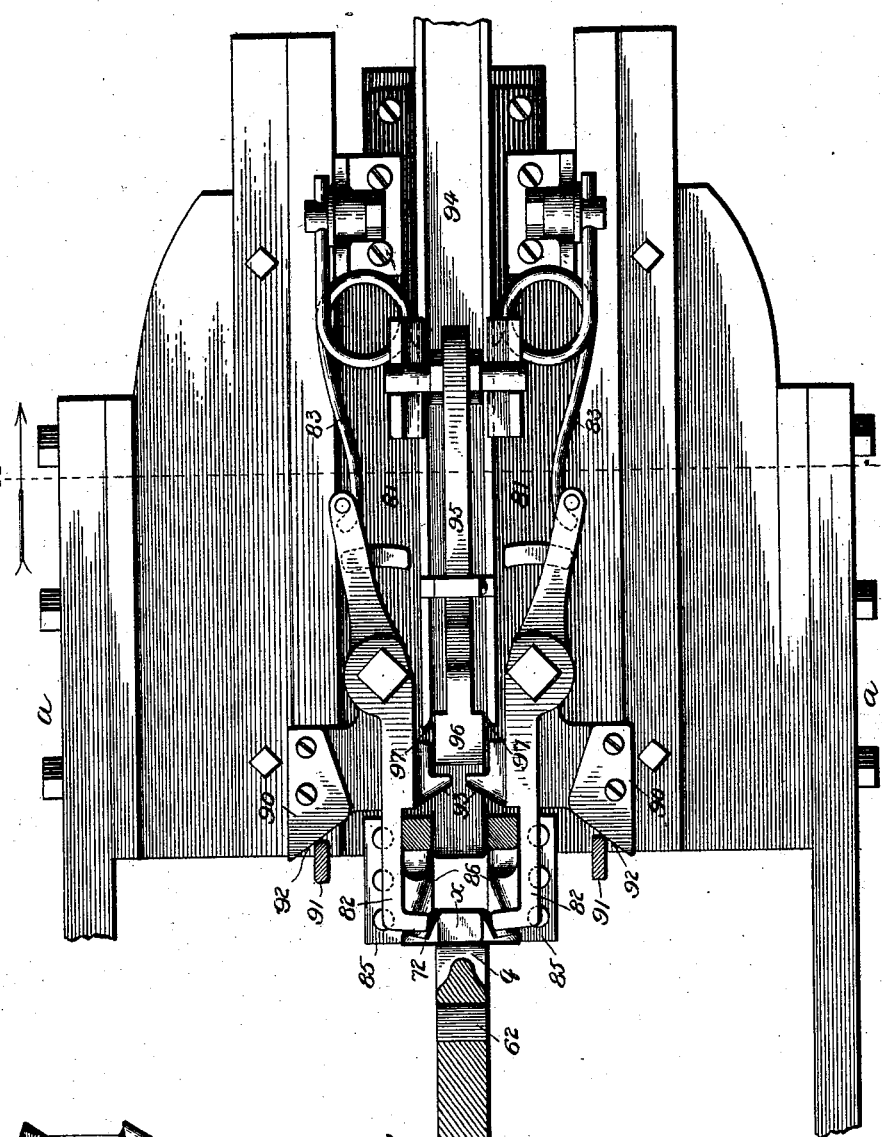

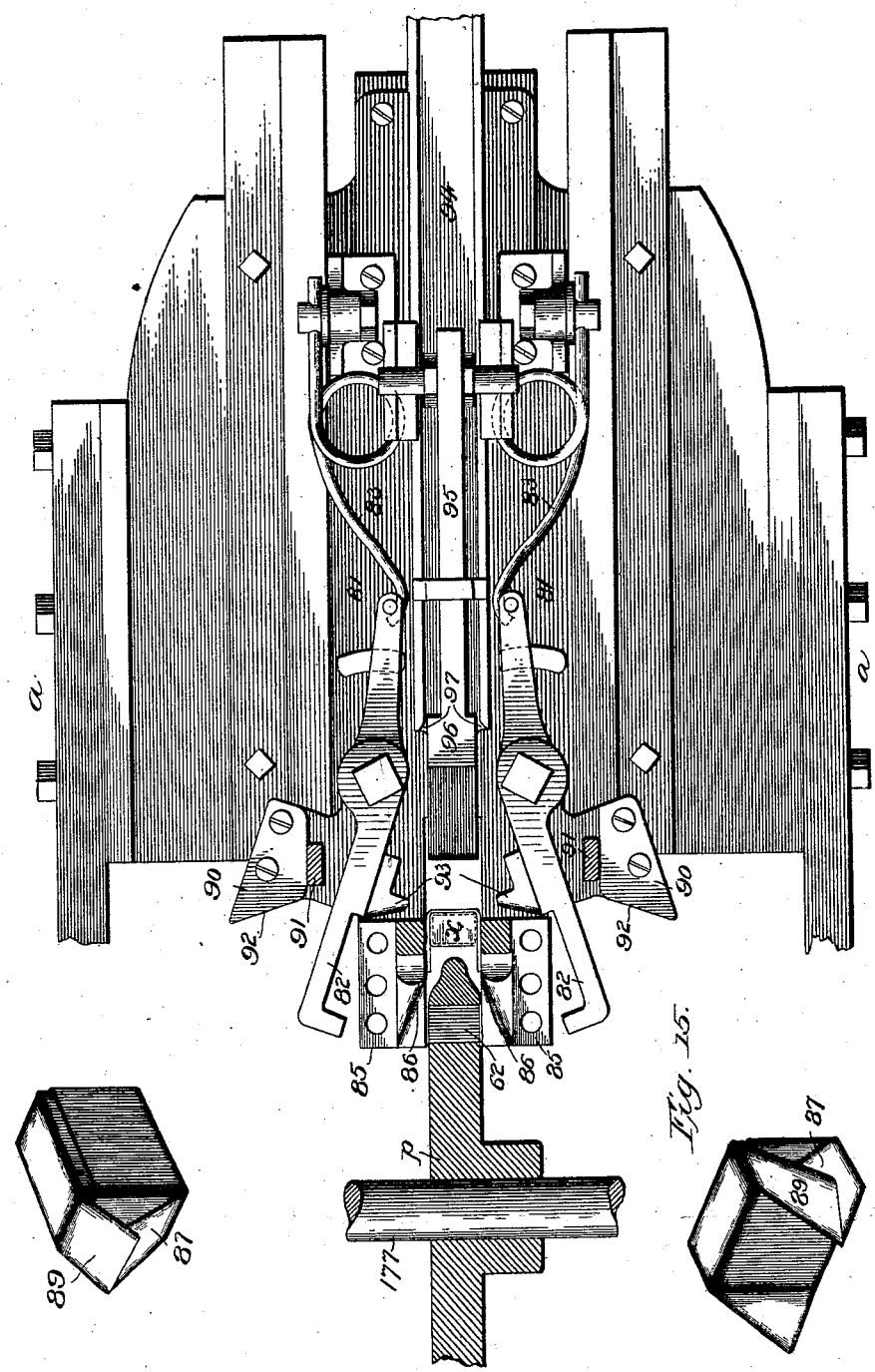

No. 715,739. Patented Dec. 16, 1902.
H. Y. ARMSTRONG.
MACHINE FOR CUTTING AND WRAPPING CARAMELS.
(Application filed Dec. 28, 1900.)
(No Model.) 18 Sheets—Sheet 10.
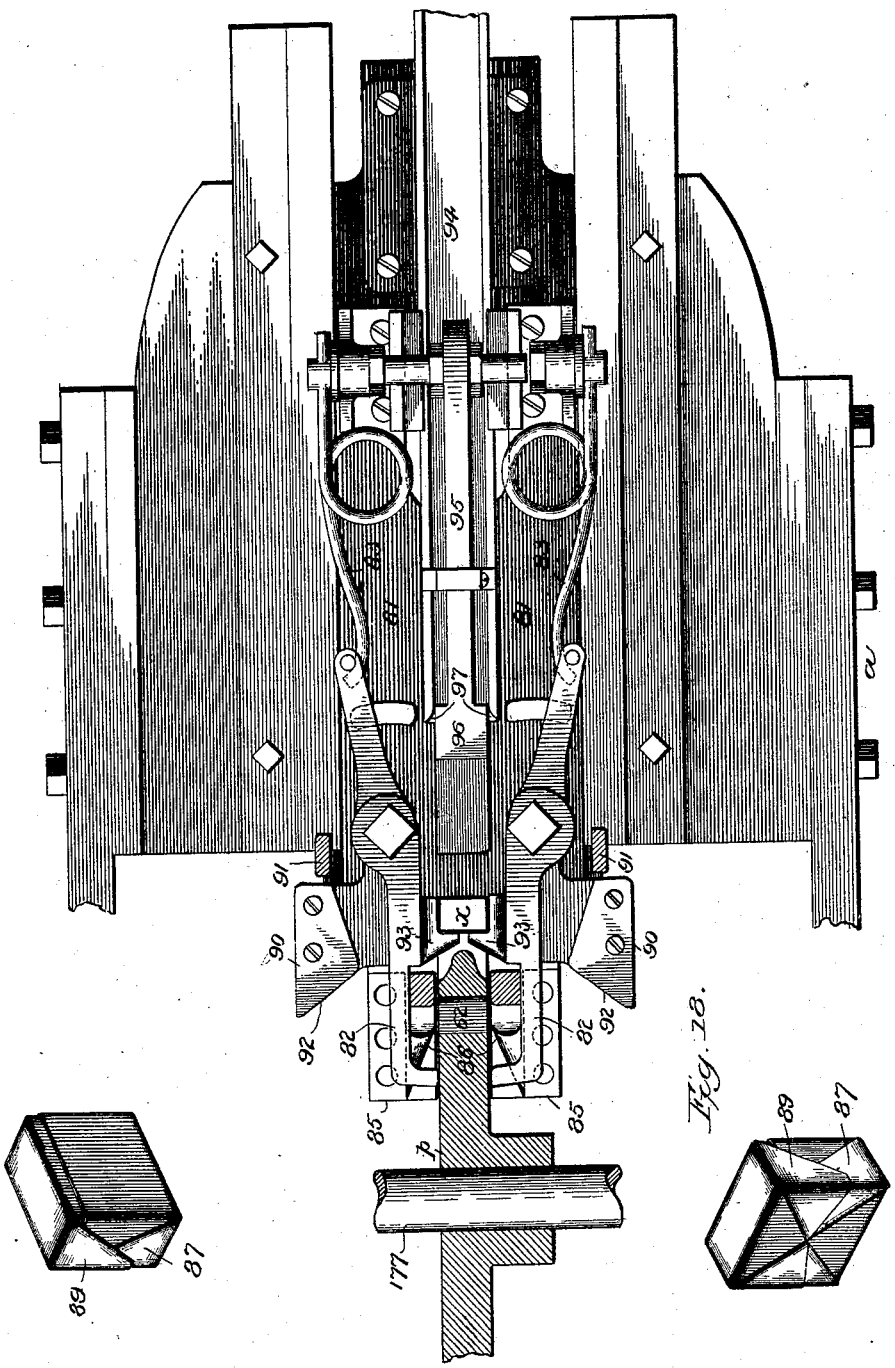
Witnesses: Inventor:
Harry Irwin Cromer. Harry Y. Armstrong,
John Enders Jr By Thomas F. Sheridan
Att'y.

No. 715,739. Patented Dec. 16, 1902.
H. Y. ARMSTRONG.
MACHINE FOR CUTTING AND WRAPPING CARAMELS.
(Application filed Dec. 28, 1900.)

(No Model.) 18 Sheets—Sheet 11.

Witnesses:
Harry Irwin Cromer
John Enders Jr.

Inventor:
Harry Y. Armstrong,
By Thomas F. Sheridan
Att'y.

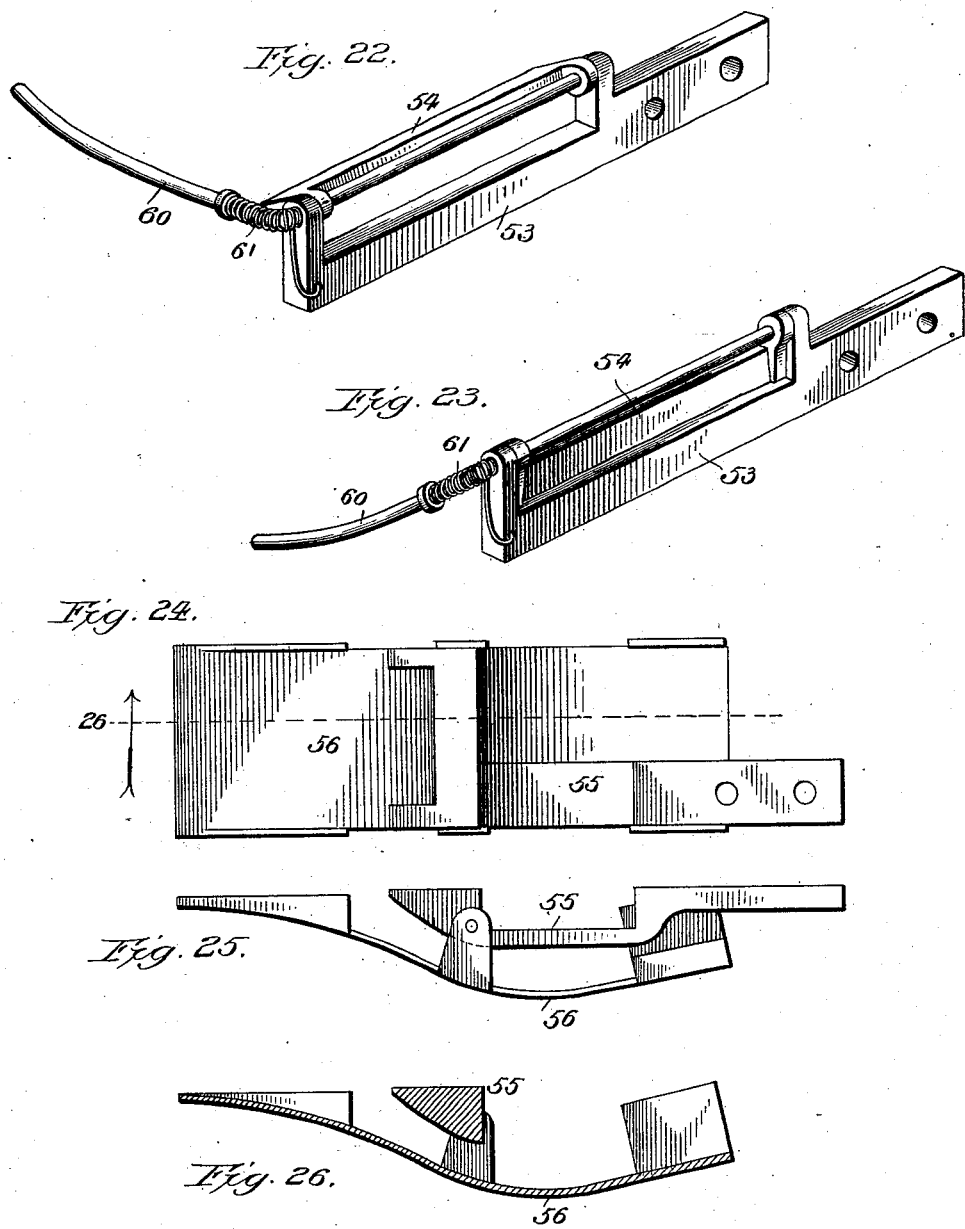

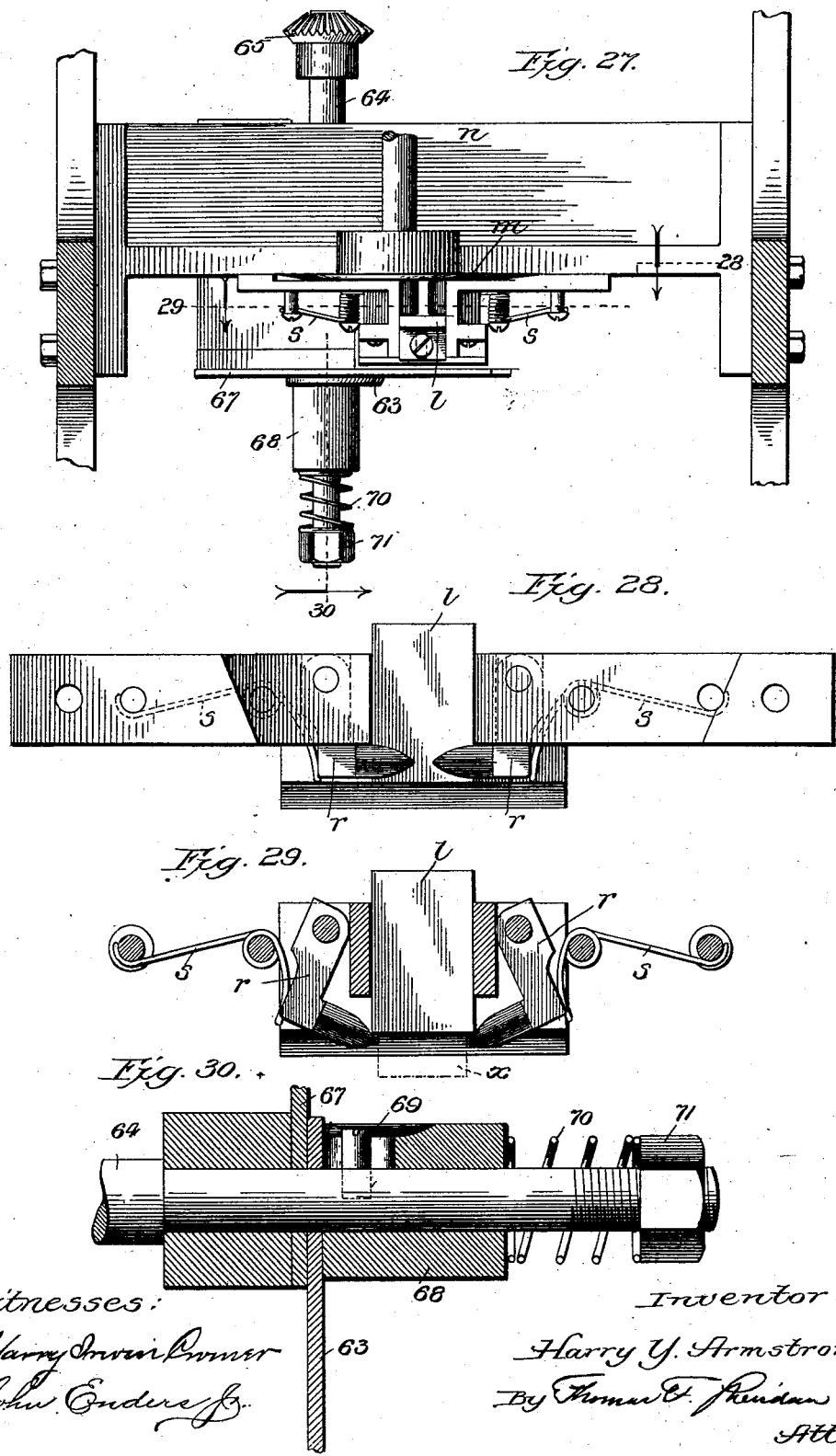

No. 715,739. Patented Dec. 16, 1902.
H. Y. ARMSTRONG.
MACHINE FOR CUTTING AND WRAPPING CARAMELS.
(Application filed Dec. 28, 1900.)
(No Model.) 18 Sheets—Sheet 14.

Witnesses: Inventor:
Harry Y. Armstrong,
By Thomas F. Sheridan
Atty.

No. 715,739. Patented Dec. 16, 1902.
H. Y. ARMSTRONG.
MACHINE FOR CUTTING AND WRAPPING CARAMELS.
(Application filed Dec. 28, 1900.)
(No Model.) 18 Sheets—Sheet 15.
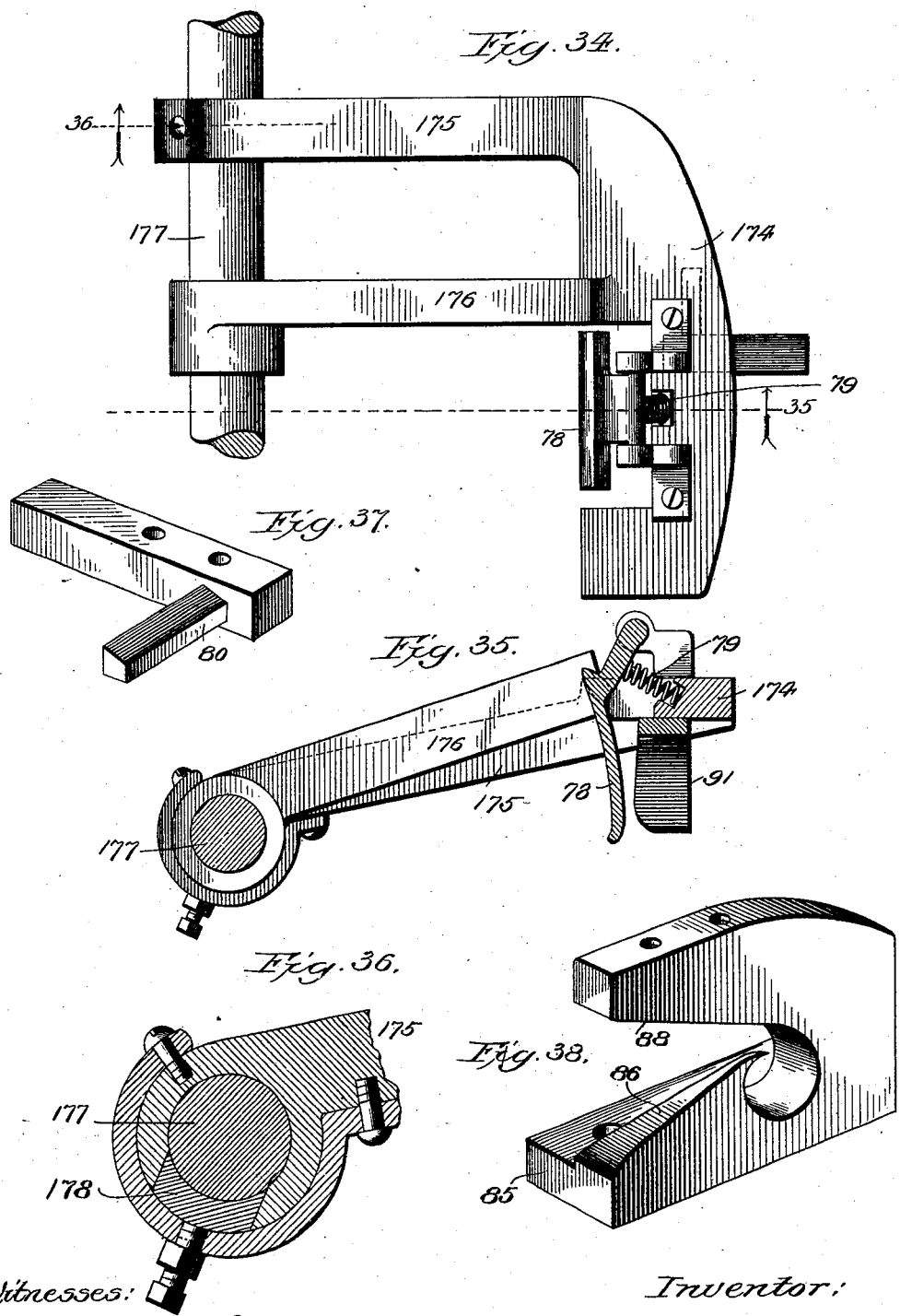

No. 715,739. Patented Dec. 16, 1902.
H. Y. ARMSTRONG.
MACHINE FOR CUTTING AND WRAPPING CARAMELS.
(Application filed Dec. 28, 1900.)

(No Model.) 18 Sheets—Sheet 16.

Witnesses:

Inventor:
Harry Y. Armstrong,
By Thomas F. Sheridan
Atty.

No. 715,739. Patented Dec. 16, 1902.
H. Y. ARMSTRONG.
MACHINE FOR CUTTING AND WRAPPING CARAMELS.
(Application filed Dec. 28, 1900.)
(No Model.) 18 Sheets—Sheet 17.
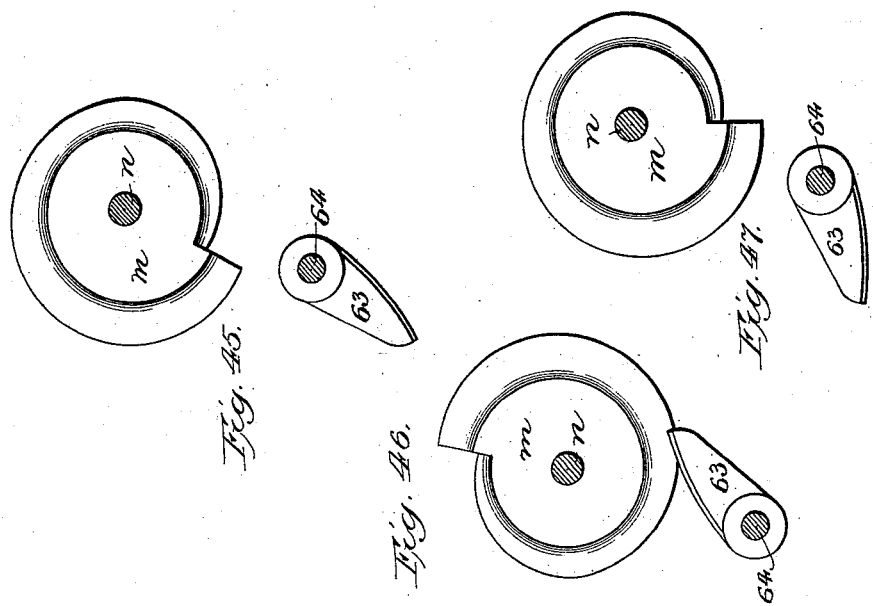
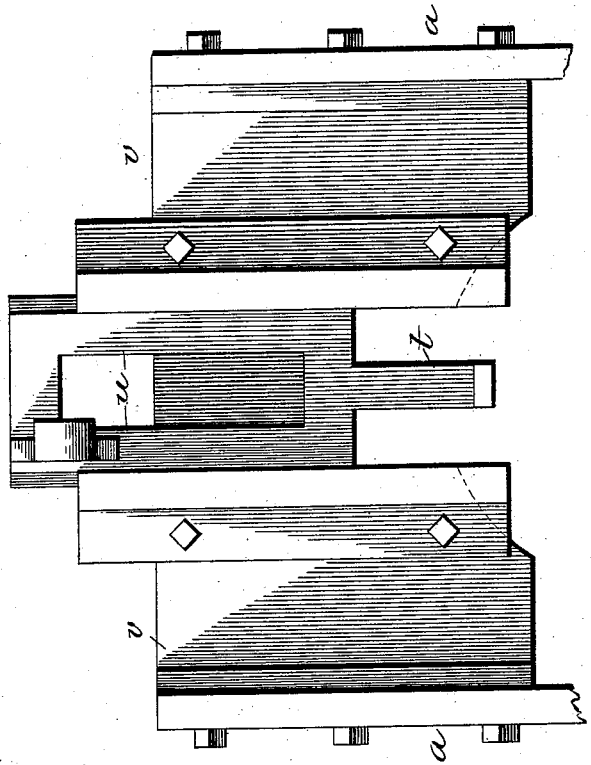
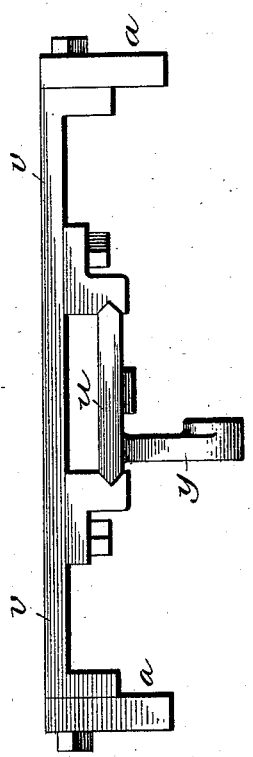
Witnesses: Inventor:
Harry Irwin Cromer. Harry Y. Armstrong.
John Enders Jr. By Thomas F. Sheridan
Att'y No. 715,739. Patented Dec. 16, 1902.
H. Y. ARMSTRONG.
MACHINE FOR CUTTING AND WRAPPING CARAMELS.
(Application filed Dec. 28, 1900.)
(No Model.) 18 Sheets—Sheet 18.
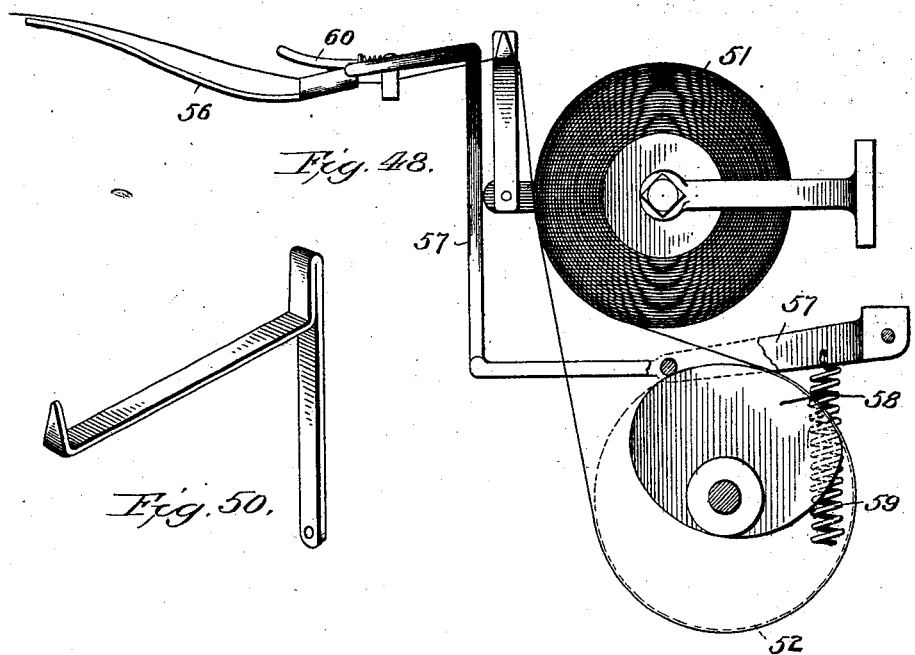
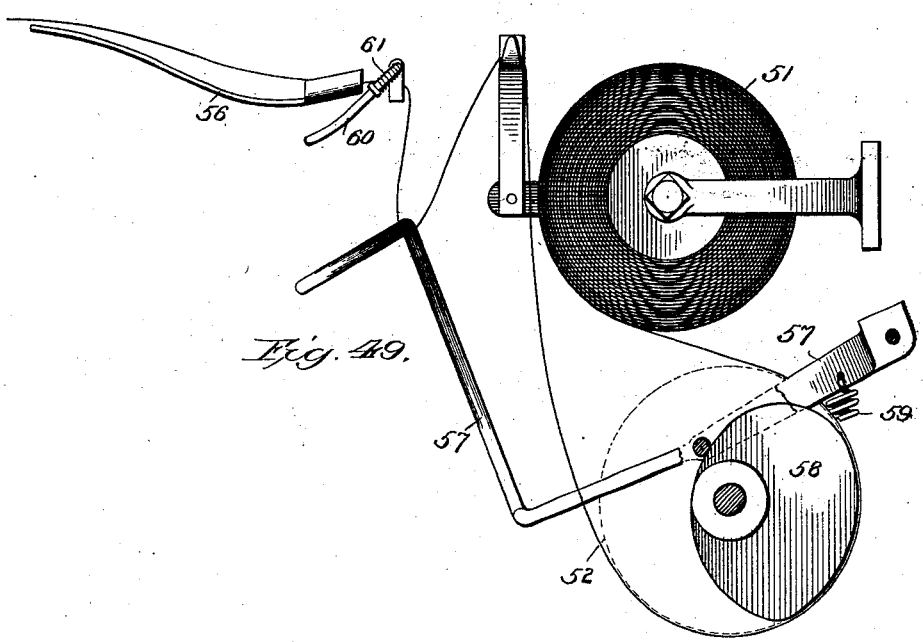

UNITED STATES PATENT OFFICE.

HARRY Y. ARMSTRONG, OF HANNA CITY, ILLINOIS, ASSIGNOR, BY MESNE ASSIGNMENTS, TO NATIONAL BISCUIT COMPANY, OF JERSEY CITY, NEW JERSEY, AND CHICAGO, ILLINOIS, A CORPORATION OF NEW JERSEY.

MACHINE FOR CUTTING AND WRAPPING CARAMELS.

SPECIFICATION forming part of Letters Patent No. 715,739, dated December 16, 1902.

Application filed December 28, 1900. Serial No. 41,371. (No model.)

*To all whom it may concern:*

Be it known that I, HARRY Y. ARMSTRONG, a citizen of the United States, residing at Hanna City, Peoria county, Illinois, have invented certain new and useful Improvements in Machines for Cutting and Wrapping Caramels, of which the following is a specification.

This invention relates to that class of machines which is used for the purpose of receiving candy caramel or similar substances in strips, cutting it into blocks or cubes, pressing it into engagement with the paper, cutting the paper, and folding it around the cube ready to pack and ship the same, all of which will more fully hereinafter appear.

The principal object of the invention is to provide a simple, economical, and efficient machine for cutting candy caramel into the desired cubes and folding paper around the same; and the invention consists in the features, combinations, and details of construction hereinafter described and claimed.

Figure 2:
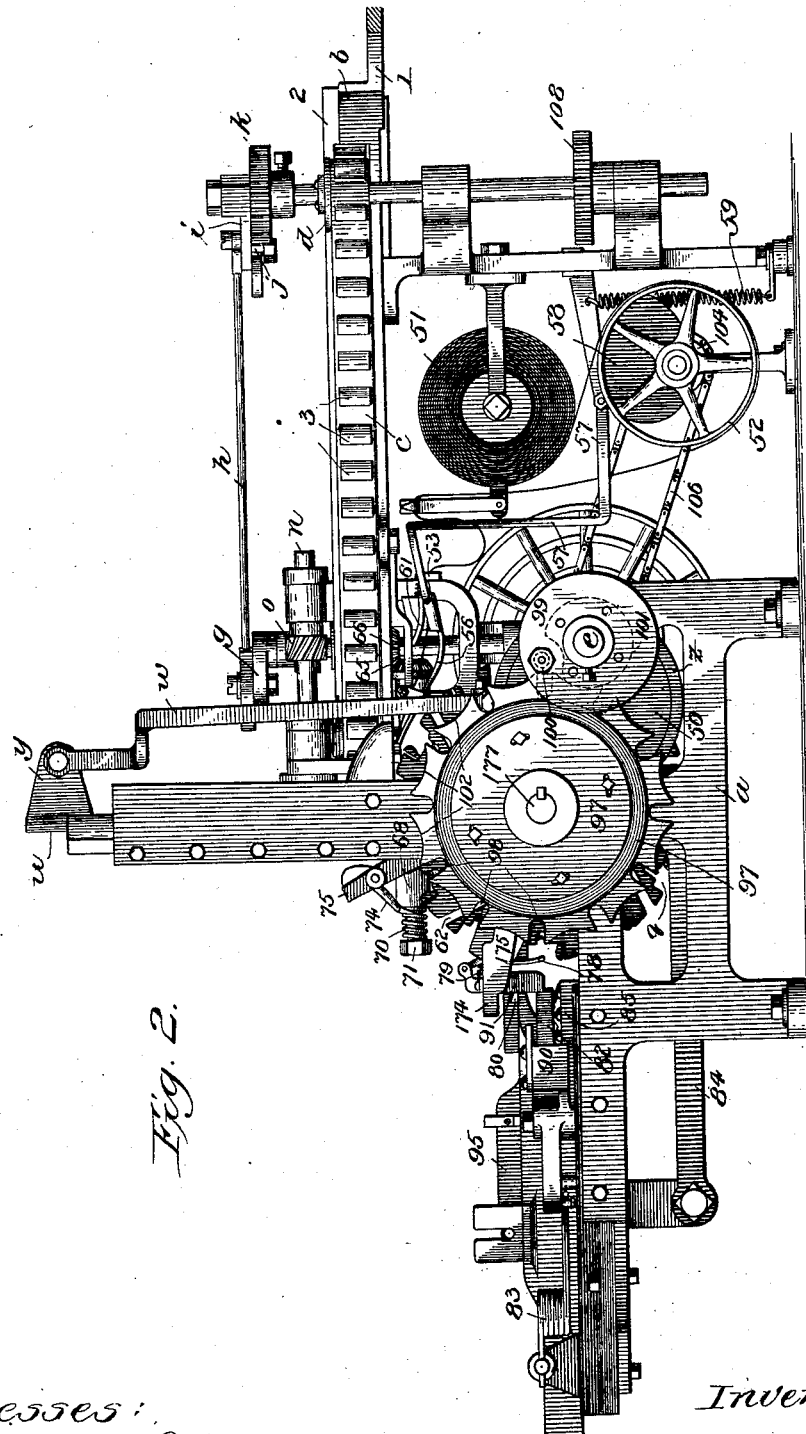
Figure 3:
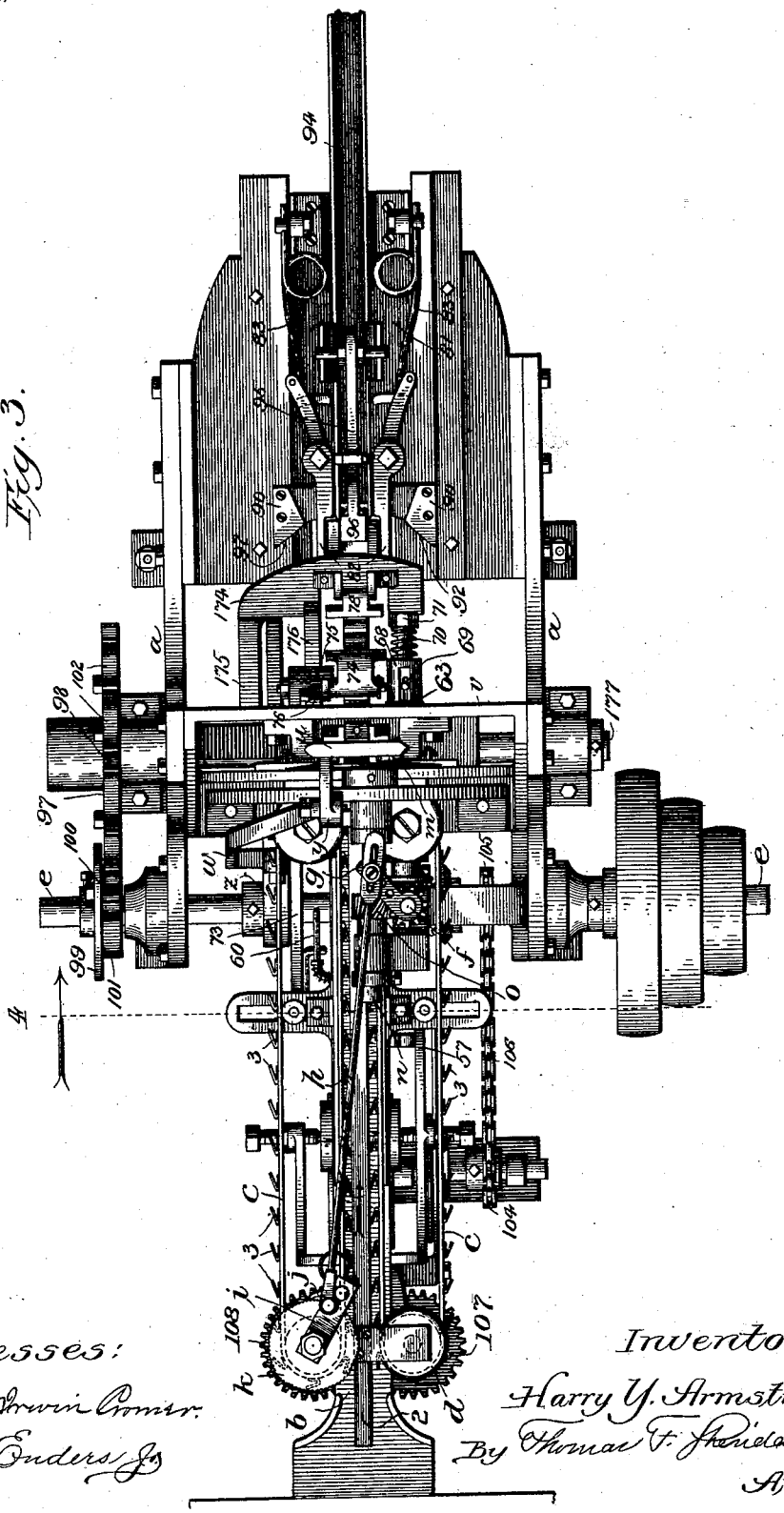
Figure 19:
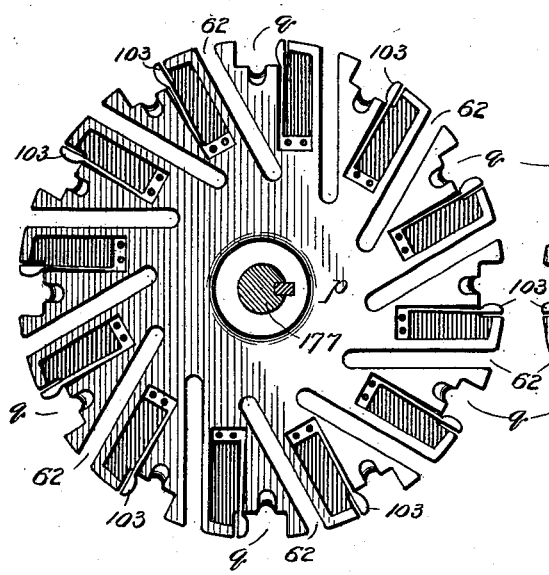
Figure 20:
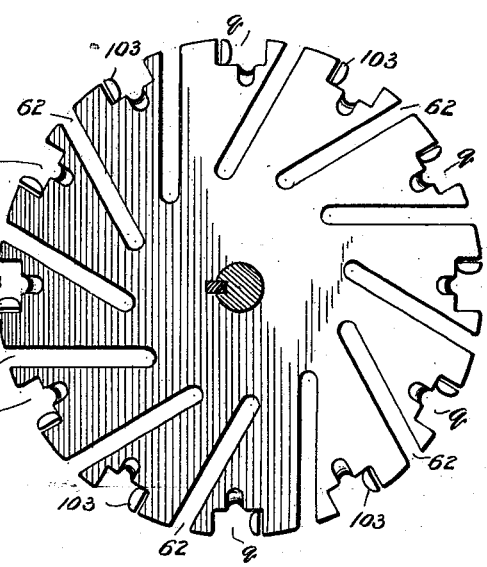
Figure 21:
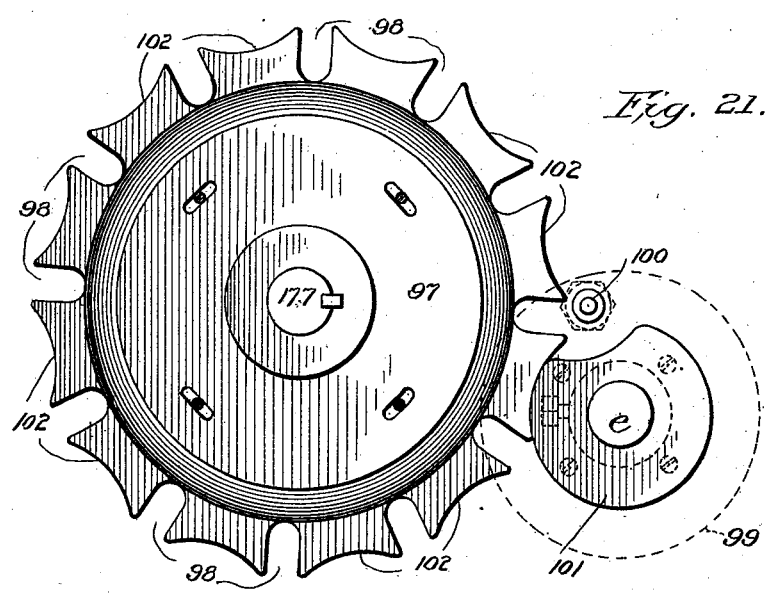
Figure 31:
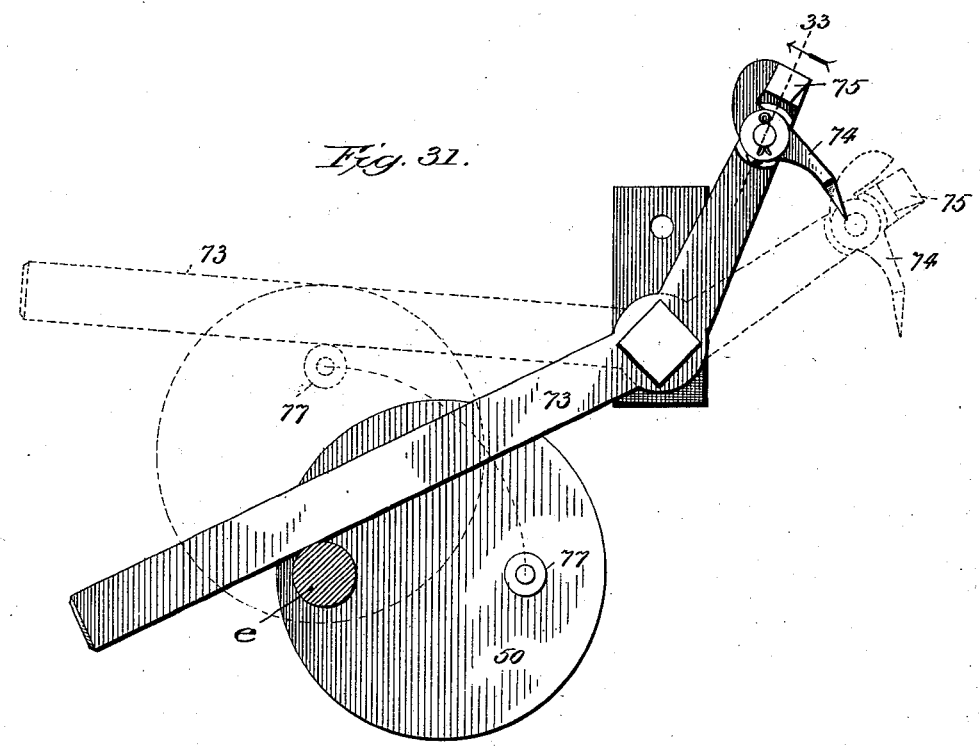
Figure 32:
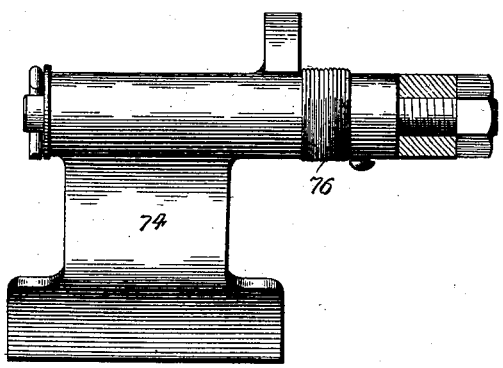
Figure 33:
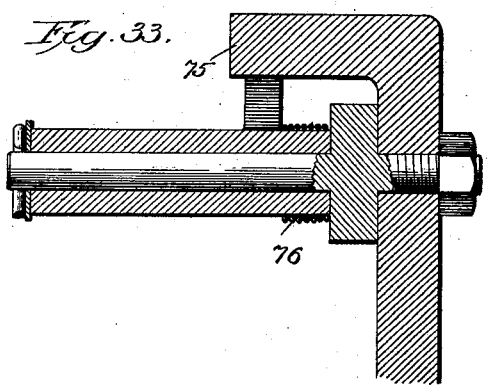
Figure 39:
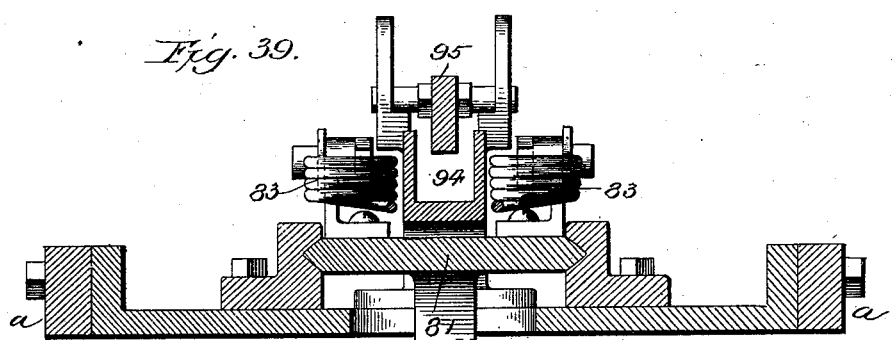
Figure 40:
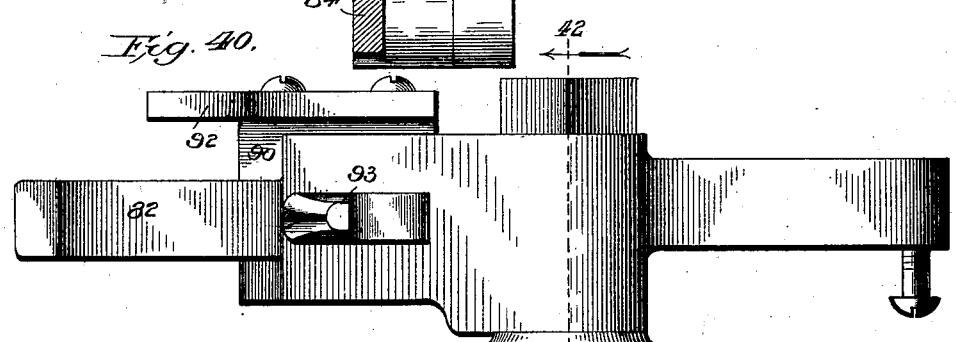
Figure 41:
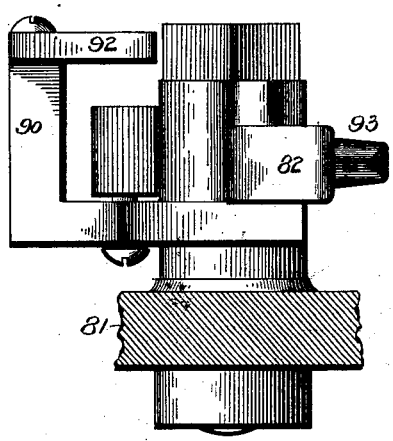
Figure 42:
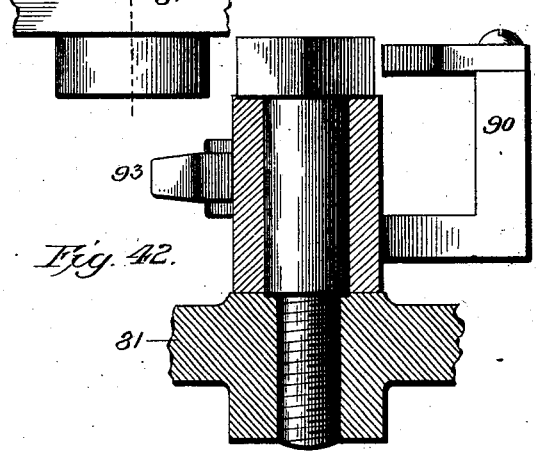

In the accompanying drawings, Figure 1 is an elevation of a machine constructed in accordance with these improvements looking at it from the right hand; Fig. 2, a similar elevation of the opposite or left-hand side of the machine; Fig. 3, a plan view looking at it from the top; Fig. 4, an enlarged sectional elevation, taken on lines 4 of Figs. 1 and 3, looking in the direction of the arrows; Fig. 5, an enlarged detail view of the rotatable head, showing the mechanism in position to accomplish the first fold of the paper; Fig. 6, a perspective view of the cube of candy and the paper after it has been cut and folded for the first time; Fig. 7, a similar view of the mechanism to that shown in Fig. 5, with the parts in position to accomplish the second folding of the paper; Fig. 8, a perspective view of the candy and paper after the second fold has been accomplished; Fig. 9, a detail view of the mechanism for accomplishing the third fold of the paper; Fig. 10, a perspective view of the candy and paper with the third fold accomplished; Fig. 11, an enlarged plan view of the mechanism, partly in section, taken on line 11 of Fig. 7, looking in the direction of the arrow and showing the mechanisms in position to accomplish the fourth fold of the paper; Fig. 12, a perspective view of the candy and paper, showing the same as it appears when the fourth fold has been accomplished; Fig. 13, a view of the mechanism shown in Fig. 11, showing the parts in position to accomplish the fifth and sixth folds of the paper; Figs. 14 and 15, details of the caramel looking at it from the front and rear, respectively, and showing the block as it appears after the fifth and sixth folds have been made; Fig. 16, a plan view of the mechanisms shown in Fig. 13, illustrating them in position to accomplish the final fold of the paper; Figs. 17 and 18, perspective views of the front and back of the package, showing it as it appears when the folding operations are completed; Figs. 19 and 20, elevations of the obverse and reverse sides of the rotatable head; Fig. 21, an elevation of the gear mechanism for operating the rotatable head; Figs. 22 and 23, perspective detail views of the clamping-gate through which the paper is passed preparatory to being cut and folded; Figs. 24, 25, and 26, detail views, respectively, of the channels through which the strip of paper is passed; Fig. 27, an enlarged plan view taken on line 27 of Fig. 1 looking in the direction of the arrow; Fig. 28, an enlarged detail view taken on line 28 of Fig. 27; Fig. 29, an enlarged detail view taken on line 29 of Fig. 27; Fig. 30, a similar view taken on line 30 of Fig. 27; Fig. 31, an enlarged detail of the mechanism for accomplishing the second fold of the paper, showing it in its different positions in full and dotted outlines; Fig. 32, a view of the mechanism shown in Fig. 31 looking at it from the end of line 33; Fig. 33, an enlarged sectional detail taken on line 33 of Fig. 31; Fig. 34, an enlarged detail view of the mechanism for accomplishing the third fold of the paper; Figs. 35 and 36, sectional details, the latter enlarged, taken on lines 35 and 36, respectively, of Fig. 34 looking in the direction of the arrows; Fig. 37, a pin for operating the third-folding lever in one direction, which is arranged to be attached to the top of the mechanism shown in the next figure; Fig. 38, a perspective view of one of the V-shaped blocks or fingers which accomplish the fifth and sixth foldings; Fig. 39, a sectional elevation taken on lines 39 of Figs. 5 and 11 looking in the direction of the arrows; Fig. 40, an enlarged detail of one of the vibratable fingers which accomplish the fourth and final foldings of the paper, as will be more fully hereinafter set forth; Fig. 41, an end view of the same; Fig. 42, a sectional detail taken on line 42 of Fig. 40; Figs. 43 and 44, sectional views of the plunger mechanism for forcing the candy into engagement with the paper and rotatable head. Figs. 45, 46, and 47 are diagrammatic views of the cutting mechanisms, showing the relative positions of the cutters which cut the candy and paper; and Figs. 48, 49, and 50 are enlarged detail views of the mechanisms for holding and feeding the paper into the machine, as will be more fully hereinafter set forth.

In constructing a machine in accordance with my improvements I make a frame portion $a$ of the desired size, shape, and strength to hold and support the operative and other mechanisms in position. It is first desirable, and indeed necessary, in this class of mechanisms that the candy or similar substance be cut or otherwise formed into strips of a desired length and cross-section, so that it may be afterward fed into the machine for the purpose of cutting it into cubes and wrapping with paper. After the candy has been cut into strips, as above suggested, it is placed in a guide or chute $b$, (see Figs. 1, 2, 3, and 4,) which is practically a long narrow channel provided with a bottom and upper portion 1 and 2, the upper of which is slightly narrower than the candy for the purpose hereinafter set forth. The next step is to provide means for feeding the strip of candy forward and cutting it into the desired size. To accomplish this, a pair of feed-belts $c$ (see Fig. 3) is provided, having spring or flexible arms 3 extending out therefrom. These flexible arms are formed of metal springs and contact the candy strip to feed it forward in the direction indicated by the arrow in Fig. 3 and are prevented from sinking too far into the candy by contacting the upper guide, as shown in Figs. 3 and 4. To support and operate these feed-belts, they are mounted upon four pulleys $d$, having their axes arranged in vertical planes, so that the pulleys rotate in horizontal planes and move the belts forward in the desired direction. To give these pulleys their desired movement, and likewise the feed-belts, a main shaft $e$ is provided, which may be connected with any suitable source of motive power and geared with a vertical feed-shaft $f$, which has a crank-arm $g$ secured to the upper end thereof. A connecting-rod $h$ is adjustably secured to this crank-arm and to a pawl-lever $i$, which is loosely pivoted on the upper end of one of the pulley-shafts. This lever carries with it a pawl $j$, which is adapted to engage with a ratchet-wheel $k$, rigidly secured to the upper end of the same pulley-shaft, the arrangement being such that as the main shaft is rotated this pawl-lever is oscillated to rotate the ratchet-wheel in a step-by-step manner, and thereby operates the feed-belts at the desired time or times and the desired distance.

The insertion of the candy strip into the machine is limited by means of a stop-plate $l$, (see Figs. 7 and 27,) which is adjustably secured in the end of the chute and against which the forward end of the strip abuts. To cut the candy at the desired time or times, a rotatable cutter $m$ is provided. (See Figs. 3, 5, and 27.) This rotatable cutter is formed in the shape of an involute and is mounted upon a shaft $n$, having a spiral gear $o$, engaging with a spiral gear of the same size and pitch upon the vertical feed-shaft, so that as the main shaft is rotated, as above described, this involute cutter is also rotated to cut the strip of candy caramel into the desired-size cubes.

Having cut the strip of caramel into cubes of the desired size fit for commercial use, the next thing is to provide means for bringing a piece of paper of the right size and shape into juxtaposition therewith and folding it around the same. In order to accomplish this result, a rotatable head $p$ is provided and mounted so that its axis is in a horizontal plane and rotates in a vertical plane. This rotatable head is provided with a series of holding-pockets $q$, arranged in the periphery thereof and which are of such size and shape as to receive the cube of candy and partially fold the same with the piece of paper. This head (see Fig. 5) is arranged, as above suggested, so as to rotate in a vertical plane and brings one of its pockets immediately under the forward end of the feed-chute adjacent to the stop portion. At this point the upper wall of the feed-chute ends, and a movable bottom portion is provided, formed of two L-shaped levers $r$, which temporarily supports the cut cube of candy (see Figs. 28 and 29) until the plunger $t$ contacts such bottom portion and forces it open against the tension of the springs $s$ and at the same time pushes the cube of candy into the adjacent pocket of the rotatable head.

To force the candy into one of the pockets of the rotatable head, as above described, the plunger $t$ is provided and mounted upon a vertical slidable cross-head $u$, (see Fig. 43,) arranged in ways $v$, secured to the main frame of the machine. This cross-head is given its reciprocating movements by means of a pitman $w$, which is connected to a projection $y$ at or near its upper portion and to an eccentric-strap $z$ at or near its lower portion, which eccentric-strap is mounted upon an eccentric 50 upon the main shaft of the machine, so that when the machine is in operation and the main shaft rotated at the proper time the cube of the caramel is cut from the strip and subsequently forced downward into one of the pockets in the rotatable head above described.

It is now desirable that means for feeding the strip of paper forward into position underneath the cube of caramel and means for cutting it off and folding it be provided. In order to accomplish this result, a roll of paper 51 (see Fig. 48) is provided and secured to the frame of the machine, as shown in Fig. 2. This roll of paper, which is composed of a strip of the desired length and width, is rolled around a core or drum and has its free end passed down around the feed-pulley 52, mounted in suitable bearings in the frame of the machine, thence up and through a clamping-gate formed of a rigid jaw 53 and a rock-shaft bearing a movable jaw 54, (see Figs. 2, 22, 23, and 48,) thence through a supporting-channel formed by the pieces 55 and 56, which are secured to the frame of the machine (see Figs. 2, 24, 25, and 26) directly under the feed-chute, so as to bring the paper forward underneath the delivery end of the feed-chute, (see Fig. 5,) where the paper-channel ends. The paper is fed forward, as above suggested, underneath the carmel cube, so that when the cube is forced down into the paper both the paper and candy are forced simultaneously into the pocket, as shown particularly in Fig. 5. It is desirable that while this is being done a certain amount of slack paper be provided. To provide for this, (see Figs. 48 and 49,) a lever 57 is pivotally secured to the frame of the machine adjacent to a cam 58, mounted upon the same shaft as the paper-feed pulley. This slacking-lever is held in its downward limit of motion by means of the spring 59 and raised upwardly, as shown in Fig. 48, by means of the cam. When raised upwardly, the paper is permitted to be drawn in by the action of the candy and paper being forced into one of the pockets of the rotatable head. When it has been forced into the rotatable head, it—the paper—is ready to be cut off by means hereinafter described, and in order to prevent it from being drawn back by the downward movement of the lever the clamping-gate above described is provided, so that when the gate is in the position shown in Figs. 48 and 22 the arm 60 is raised to permit the paper to be drawn through; but during the downward movement the arm is released and the gate permitted to close, which pinches the paper, prevents it from being drawn back, and permits the slacking-lever to pull down the paper the desired extent.

Having fed the paper forward and forced it into one of the pockets of the rotatable head, it is desirable that some means be provided for cutting it off at the desired point. To accomplish this, the rotatable head, which is provided with a number of radial grooves 62, is moved forward one step, drawing the end of the paper forward the desired distance past the paper-cutter, as shown in Fig. 5. (See also Fig. 7.) A cutter 63 is provided and yieldingly mounted upon a shaft 64 (see Figs. 1, 27, and 30) and arranged to be rotated so as to pass through the groove 62, which is in the vertical plane, as shown in Fig. 5, and thus cut the paper. The inner end of the shaft 64, which carries the paper-cutter, is provided with a bevel-pinion 65, which engages with a similar bevel-pinion 66 upon the vertical feed-shaft, so that when the main shaft is rotated this paper-cutter is rotated, with its shaft, at the proper time to pass through the radial slot in the rotatable head above set forth and cut the paper off to the desired size. It is desirable that this paper-cutter be held upon the shaft in an easy manner, so that it may adjust itself to different mechanisms when passing through the radial slots in the rotatable head. In order to accomplish this result, (see Fig. 30,) the cutter is mounted on the shaft, as therein shown, and held against the plate 67 by means of a loose sleeve or collar 68, mounted upon the shaft 64 and compelled to turn therewith by means of the screw-key 69, but has an independent longitudinal movement. A tension-spring 70 and an adjustable nut 71 hold the paper-cutter against this plate in a yielding manner, so as to cut the paper between it and the plate as the cutter edge moving upward comes in contact with the lower edge of the cutter-plate and the paper, all of which permits the cutter to follow any irregularities of the plate 67.

Describing now the mechanism for folding the paper: When the cube of candy $x$ is forced into one of the pockets, as shown in Fig. 5, and the piece of paper cut off, it is partially folded, as shown by the partially-folded package 72 in Fig. 6—that is, a cross-section of the paper would resemble the cross-section of a channel-beam. It is desirable that mechanism be then provided to complete the folding of the paper in as simple, economical, and efficient a manner as possible. To give the paper its next or second fold, as shown in Fig. 8, a vibrating lever 73 is provided and pivotally secured to the frame in any desired position, having a finger 74 at the outer end held under tension against a stop 75 by means of a spring 76. As a pin or roller 77 upon the above-described eccentric moves around it contacts one end of the vibrating lever and raises it into the position shown in dotted outline in Fig. 31, while at the same time (see Fig. 7) the other end of the lever carrying the finger 74 is moved downward over the periphery of the rotatable head, so as to contact one edge of the paper and fold it down into the position shown in Fig. 8. The continued movement of the eccentric releases the heavy inner end of the lever 73, which we will term the "primary" folding-lever, and permits it to move downward into the position shown in full lines in 31 and carry its finger backward into the position to make the second fold when the next package is brought into the desired position. To make the third fold of the paper, as shown in Fig. 10, a second folding-lever 174 is provided, having two arms 175 and 176, which hold or mount it upon the shaft 177, which carries the rotatable head. One of these arms is provided with a friction-block 178, by which the mechanisms are compelled to rotate a step or portion of the rotation of the supporting-shaft or until they strike an obstruction, but are permitted to move in an opposite direction when extraneous force is used, as hereinafter described. The outer end of this lever is also provided with a folding-finger 78, which is pivoted thereto and held under tension by means of a spring 79 against the peripheral face of the rotatable block, so that as a pin 80, which is secured to a slidable block hereinafter described, is moved forward it contacts the arm 176, raises the foldable lever against the movement of the supporting-shaft, and raises the yielding finger, so as to fold a paper over into the position shown in Figs 9 and 10, and thereby accomplish the third fold. The movement of the shaft carries the lever back until it sticks with its outer end against the pin 80, which holds it in such position until it is raised again by the movement of the pin. It is necessary to provide means by which the fourth fold of the paper is accomplished, as shown in Figs. 11 and 12, and for this purpose the rotatable head is moved around one step in its rotation and the particular pocket brought into substantial alinement with a supporting-slide 81, arranged to slide or reciprocate in the frame of the machine and in a horizontal plane. This slide is provided with a pair of folding-fingers 82, pivotally secured thereto, so as to oscillate or vibrate in a horizontal plane, and held at their inner limit of motion by means of springs 83. These fingers, as shown particularly in Fig. 11, have inwardly-projecting portions at their extreme forward ends, which as the sliding block is moved forward toward the rotatable head contact the front ends of the partially-folded paper and force it into the position shown in Fig. 12, thus accomplishing what I term the "fourth" fold to the paper. The supporting-slide which carries these folding-fingers is moved forward by means of a pitman 84, which is secured to a projection in the lower part of the slide and to the eccentric-strap $z$, above mentioned, so that during the rotations of the eccentric the slide, with its foldable fingers, is reciprocated and moved forward and backward toward and from the rotatable head. To accomplish the next or fifth and sixth folds, the sliding block carries with it and has mounted thereon a pair of V-shaped fingers 85, as shown in Figs. 5 and 38, secured thereto at or near its front end, one to each side of the center. The lower member of this finger is inclined inwardly, as at 86, so as to make the fifth fold of the paper, as shown in Fig. 15 at 87, and straighten out the end. The upper member of the finger, as at 88, contacts the upper flap and forces it down to make the sixth fold, as shown at 89 in Fig. 15, while the continued forward motion of the entire block moves it back into the position of wings, as shown in Fig. 15, for the final folding. While this, the fifth and sixth foldings, is being done it is desirable that the vibratable folding-fingers, which are pivotally secured to the supporting-slide, be moved outwardly into the position shown in Fig. 13. To accomplish this, such fingers are provided with outwardly and upwardly extending arms bearing cam-plates 90, (see Figs. 11 and 13,) arranged to contact a downward projection 91 on the second-folding lever, as shown in Fig. 9, which striking the inclined surface 92 on these cam-plates forces such foldable fingers out against the tension of their springs and permits the V-shaped fingers to make the final fold. To secure the final folding of the paper and the extraction of the completely-folded package, the vibratable folding-fingers are provided with a second set of inward projections 93, (shown particularly in Figs. 13 and 16,) so that when the cam-plates 90 have passed by the projections 91 on the second-folding levers, the relative position of which is shown in Fig. 16, the springs force them inwardly, which action brings the projections 93 into engagement with the paper and folds the extending or unfolded ends thereof into the position shown in Figs. 17 and 18, and thus completes the folding of the package. The retraction of the slide permits the last-named projections 93 to extract the completed package and force it into a discharge-channel 94. To keep the folded packages down in the discharge-channel, a weight-strip 95 is permitted to rest loosely in the upper part of the groove or channel and has a detent 96 at its forward end to engage the completed packages and prevent their return or forward movement, but permits them to be moved outward into the desired receptacle.

To operate the rotatable head at desired times and in a step-by-step manner, one end of the shaft 177, which supports the same, is provided with a disk or plate 97, having a plurality of radial grooves 98 therein, one for every pocket in the peripheral surface of the rotatable head. Secured upon the main shaft is a disk 99, bearing a pin 100, adapted to engage with each one of these radial grooves and move the "gear-plate," as I prefer to term it, one step in its rotation for every rotation of the main shaft. The main shaft is also provided with what might be termed a "stop-disk" 101, which engages with concavities 102 in the face of the gear-plate and prevents such plate from being rotated at all times, except when engaged by the pin 100, as shown in Figs. 2 and 21, and thus insure the rigidity of the parts at the desired time or times.

As shown in Figs. 19 and 20, the peripheral pockets in the rotatable head are provided with springs 103, which form a yielding wall for one side of the pocket and serve to pinch or hold the cube of candy and piece of paper while it is being operated upon. To operate the paper feed wheel or pulley at the desired times, the shaft upon which it is supported is provided with a sprocket-wheel 104 and the main shaft with a sprocket 105, (see Figs. 1 and 4,) connected together by means of a link belt 106, which transmits power and motion at the desired time and practically at all times during the operation of the machine. The vertical shafts upon which the pulleys which support one end of the feed-belts are mounted are provided with a set of spur-gears 107 and 108, engaging with each other, so as to transmit power and motion simultaneously to the feed-belts and keep them running in the desired direction.

I claim—

1. In a machine of the class described, the combination of a rotatable head for receiving and carrying pieces of candy and paper around therewith to form packages, means for feeding the paper adjacent to the head, means for feeding candy adjacent to the paper and head, means for cutting the candy into pieces, means for feeding the candy pieces with the paper into engagement with the rotatable head, and means for folding the paper around the candy while in the head, substantially as described.

2. In a machine of the class described, the combination of a rotatable head provided with a series of holding-pockets, means for feeding a piece of paper forward to the pocket, means for feeding candy adjacent to the paper and pocket, means for cutting a piece of the desired size from the candy while such portion is in position adjacent to the pocket, means for forcing the piece of candy into the pocket, and means for folding the paper around the candy while in the head, substantially as described.

3. In a machine of the class described, the combination of a rotatable head provided with a series of pockets in its peripheral surface, means for feeding a piece of paper adjacent to the pockets in the rotatable head, means for feeding a strip of candy adjacent to the paper and head, means for cutting the strip of candy into pieces, means for forcing a piece of candy and paper into each pocket, means for folding the paper around the candy while in the head, and means for rotating the head step by step, substantially as described.

4. In a machine of the class described, the combination of a rotatable head provided with a series of pockets in its periphery, means for feeding a strip of paper adjacent to one of the pockets, means for feeding candy adjacent to the pockets in the head, means for cutting candy into pieces, means for forcing the pieces of candy into such pockets with the paper, means for cutting off the paper, and means for folding the paper around the candy while in the head, substantially as described.

5. In a machine of the class described, the combination of a rotatable head provided with a series of pockets in its periphery, means for feeding a strip of paper adjacent to the pockets, means for forcing a piece of candy into each of such pockets with the paper, means for cutting off the paper, folding mechanism mounted adjacent to and separate from the head for folding the paper around the candy while in the head, and means for discharging the completed package out of the head, substantially as described.

6. In a machine of the class described, the combination of a rotatable head provided with a series of pockets in its periphery, means for feeding a strip of paper adjacent to one of the pockets, means for feeding a strip of candy or similar material with the strip of paper adjacent to the same pocket, means for cutting off the strip of candy into cubes, means for forcing a cube of candy with the paper into the pocket in the rotatable head, means for cutting off the paper to the desired size, and means for folding the paper around the candy while the head is rotated step by step, substantially as described.

7. In a machine of the class described, the combination of a rotatable head provided with a series of pockets in its periphery, means for feeding a piece of paper adjacent to one of the pockets, belt mechanism provided with flexible projections for feeding a strip of candy adjacent to the same pocket as the paper, means for cutting the strip of candy into cubes, means for forcing a cube of the candy with the paper into the pocket of the rotatable head, and means for folding the paper around the candy while the head is rotated step by step, substantially as described.

8. In a machine of the class described, the combination of a rotatable head provided with a series of pockets in its periphery, means for feeding a strip of paper adjacent to one of the pockets, a feed-chute through which a strip of candy is delivered to the same pocket, belt mechanism provided with flexible projections for feeding the strip of candy along the chute, means for cutting the strip of candy into cubes, means for forcing a cube of the candy with the piece of paper into the pocket of the rotatable head, means for cutting off the piece of paper from the strip, means for folding the paper around the candy while the head is rotated step by step, a discharge-chute, and means for discharging the completed package from the rotatable head into the discharge-chute, substantially as described.

9. In a machine of the class described, means for feeding a strip of candy forward into engagement with the machine, composed of a feed chute or channel provided with upper and lower walls only, a pair of belts forming the side walls thereof and provided with flexible wings or projections adapted to contact the candy and force it forward, pulley mechanism for sustaining the belts in position and moving them in their path, pawl-and-ratchet mechanism in engagement with one of the pulleys, crank mechanism engaged with the main shaft, and a connecting-rod connecting the crank with the pawl mechanism to move the ratchet and thereby the feed-belt mechanism step by step at the desired times during the rotation of the main shaft, substantially as described.

10. In a machine of the class described, means for feeding a strip of paper from a roll into the machine, comprising the candy-holding mechanism adapted to engage one end of the strip of paper when a piece of candy is forced into the same, clamping mechanism arranged between the candy-holders and the paper-roll to check, hold and release the paper at desired times, a slacking-lever arranged intermediate the clamping mechanism and the roll of paper and arranged to be operated in one direction to provide slack when the clamping mechanism is closed and move in the opposite direction when the jaws are open to permit the paper to pass into the machine, and cam mechanism for giving the slacking-lever the desired movements, substantially as described.

11. In a machine of the class described, means for feeding paper forward, which consists of a rotatable feed-pulley around and against which the band of paper may contact at the desired times to be fed forward, a clamp composed of a rigid and a movable jaw between which the strip of paper may be grasped, a lever-arm for providing slack to the paper and arranged between the clamp and the roll of paper when the clamp-jaws are closed, and cam mechanism for raising the slacking-lever at the desired time to open the clamp and permit the paper to be drawn through into the machine and the slacking-lever to be dropped to provide the slack and bring the paper into contact with the feed-pulley, substantially as described.

12. In a machine of the class described, the combination of a rotatable head provided with a series of pockets in its peripheral surface, means for feeding the paper into engagement with a piece of candy so that it may be forced with the candy into the pocket, comprising a channel portion for guiding the strip of paper into engagement with the rotatable head, clamp mechanism comprising a stationary and a pivotal jaw adapted to clamp the paper to prevent its extraction from the rotatable head, a slacking-lever provided with an arm adapted to contact the swinging jaw in one of its operations to open the same and permit the paper to be drawn into the machine and when moved in the other direction to release such jaw and permit it to clamp the paper and to provide slacking for the next operation, means for operating such slacking-lever, and a rotatable pulley around which the strip of paper is passed and with which it is arranged to contact at the desired times to feed the paper forward, substantially as described.

13. In a machine of the class described, combination of a rotatable head provided with a series of pockets in its periphery, a feed-chute for guiding a strip of candy adjacent to one of the pockets, means for feeding the strip of candy forward to the pocket, means for furnishing a strip of paper adjacent to the same pocket as the candy, a cutter adjacent to the head for cutting the candy strip into cubes while adjacent to the pocket, a main shaft, gear mechanism for operating the rotatable head by means of the main shaft, gear mechanism for rotating the candy-cutter by the operations of the main shaft, a rotatable shaft provided with a paper-cutting knife mounted thereon for cutting the paper at the desired times and arranged to be operated by means of the main shaft, and means for folding the paper around the candy while the head is rotated step by step, substantially as described.

14. In a machine of the class described, the combination of a rotatable head provided with a series of pockets in its periphery and a series of slots or grooves opening out of its periphery—one arranged between each pair of the peripheral pockets and through which a cutting-knife may be passed, means for feeding a strip of paper forward adjacent to one of the pockets in the rotatable head, means for forcing a piece of candy with the strip of paper into engagement with one of the pockets in the rotatable head, a continuously-rotating shaft provided with a cutting-knife arranged at the proper time to be passed through the slots in the rotatable head to cut off the paper, and means for folding the paper around the candy while the head is being rotated, substantially as described.

15. In a machine of the class described, the combination of a rotatable head provided with a series of pockets in its peripheral surface and a series of slots or grooves opening out of the periphery—one arranged between each pair of pockets, means for feeding a strip of paper forward so as to engage one of the pockets in the rotatable head, a chute through which a strip of candy is fed adjacent to the pocket of the rotatable head, a cutter for cutting the strip of candy into cubes, means for forcing the end of the strip of paper with the cube of candy into the pocket of the rotatable head, a continuously-rotating shaft provided with a cutter arranged to pass through one of the slots in the rotatable head and cut the paper to the desired size, means for rotating the head step by step, means for preventing the head from being rotated at the desired times, and means for folding the paper around the candy while the head is rotated step by step, substantially as described.

16. In a machine of the class described, the combination of a rotatable head provided with a series of holding-pockets in its periphery, means for furnishing a piece of paper adjacent to one of the pockets, a feed-chute along which a strip of candy is fed to the pocket, means for cutting the strip of candy into cubes, means for forcing the piece of candy and paper in the holding-pocket of the rotating head, a vibratable lever provided with a yielding finger arranged to move back and forth adjacent to the peripheral face of the rotatable head to partially fold the paper, a second vibratable lever also provided with a yielding finger arranged also to move back and forth adjacent to the peripheral face of the rotatable head and partially fold the paper, a supporting-slide arranged to move forwardly and backwardly toward and from the peripheral face of the rotatable head, folding mechanism arranged on the supporting slide, and means for extracting the folded package from engagement with the rotatable head, substantially as described.

17. In a machine of the class described, the combination of a rotatable head provided with a series of pockets in its periphery and a series of slots, one of which is arranged between each pair of pockets, means for feeding a strip of paper forward into position to engage one of the pockets, a chute through which a strip of candy may be fed adjacent to the same pocket, means for cutting off the strip of candy into cubes, a plunger for forcing a cube of the candy with the end of the strip of paper into engagement with a pocket in the rotatable head to make the first fold, a continuously-rotating cutter arranged to pass through one of the slots in the rotatable head and cut off the strip of paper into pieces at the proper time, a vibratable lever provided with a finger reciprocating over the periphery of the rotatable head to make the second fold, a second vibratable lever arranged to be passed back and forth on the periphery of the rotatable head to make the third fold, and a supporting-slide arranged to move forward and backward toward and from the rotatable head provided with a pair of stationary and a pair of pivoted fingers to complete the folding of the paper around the candy and extract the candy in the completed package from engagement with the rotatable head, substantially as described.

18. In a machine of the class described, the combination of a rotatable head provided with a series of pockets in its periphery and a series of slots, one of which is arranged between each pair of pockets, means for feeding a strip of paper forward into position to be engaged by one of the pockets, a chute through which a strip of candy may be fed adjacent to the same pocket, means for cutting off the strip of candy into cubes, a plunger for forcing a cube of the candy with the end of the strip of paper into engagement with a pocket in the rotatable head to make the first fold of the paper, a continuously-rotating cutter arranged to pass through one of the slots in the rotatable head and cut off the strip of paper into pieces at the desired time, a vibratable lever provided with a finger reciprocating over the periphery of the rotatable head to make the second fold, a second vibratable lever arranged to be passed back and forth on the periphery of the rotatable head to make the third fold, a supporting-slide arranged to move forward and backward toward and from the rotatable head, a pair of fingers vibratingly mounted in the sliding block and provided with inwardly-projecting ends to perform the fourth folding of the paper, means for forcing the inwardly-projecting ends of the fingers out of engagement with the paper at the proper time, a pair of V-shaped folders rigidly secured to the slidable block to perform the next steps in the folding of the paper, and a second set of projections on the vibratable folding-fingers adapted to contact with the paper at the proper time, complete the folding, and extract the completed package from engagement with the rotatable head, substantially as described.

19. In a machine of the class described, the combination of a rotatable head provided with a series of holding-pockets in its peripheral surface, means for furnishing a piece of paper adjacent to one of the pockets, a feed-chute along which a strip of candy is fed to one of the pockets in the rotatable head, means for cutting the strip of candy into cubes, means for forcing the candy cube and its piece of paper into engagement with the pocket to first fold the paper, means for rotating the head step by step to permit the folding of the paper around the candy, a vibratable lever provided with a yielding finger arranged to move back and forth adjacent to the peripheral surface of the rotatable head and perform the second step in the folding of the paper, a second vibratable lever provided with a yielding finger arranged to move backward and forward adjacent to the peripheral surface of the rotatable head and perform the third step in the folding of the paper, a supporting-slide arranged to move forward and backward toward and from the peripheral surface of the rotatable head, a pair of vibratable fingers yieldingly mounted on such supporting-slide and provided with inwardly-projecting forward portions arranged to contact the paper and perform the fourth step in the folding of the paper, wings or projections secured to the pair of vibratable fingers and arranged to contact the second folding-lever and be moved out of engagement at the proper time with the paper, a pair of V-shaped folders rigidly secured to the supporting-slide to perform the fifth and sixth steps of the folding, and a second set of inward projections on the vibratable yielding fingers arranged when the fingers have passed out of contact with the second folding-lever to contact the paper, complete the final folding and extract the completed package from engagement with the rotatable head during the backward movement of the slide, substantially as described.

20. In a machine of the class described, the combination of a rotatable head provided with a series of holding-pockets in its peripheral surface, means for furnishing a piece of paper adjacent to one of the pockets in the rotatable head, means for cutting the strip of candy into cubes, means for forcing a cube and its piece of paper into engagement with the pocket, means for rotating the head step by step to permit the folding of the paper around the candy, a vibratable lever provided with a yielding finger arranged to move back and forth adjacent to the peripheral surface of the rotatable head and perform the second step in the folding of the paper, a second vibratable lever provided with a yielding finger arranged to move backward and forward adjacent to the peripheral surface of the rotatable head and perform the third step in the folding of the paper, a supporting-slide arranged to move forward and backward toward and from the peripheral surface of the rotatable head, a pair of vibratable fingers yieldingly mounted on such slidable block and provided with inwardly-projecting forward portions arranged to contact the paper and perform the fourth step in the folding of the paper, wings or projections secured to the pair of vibratable fingers and arranged to contact the second folding-lever and be moved out of engagement at the proper time with the paper, a pair of V-shaped folders rigidly secured to the slidable block to perform the fifth and sixth steps of the folding, a second set of inward projections on the yieldable fingers arranged when the fingers have passed out of contact with the second folding-lever to contact the paper, complete the final folding and extract the completed package from engagement with the rotatable head during the backward movement of the slidable block, and a discharge-chute arranged in line with the movement of the slide and adapted to receive the completed package from the yielding fingers and deliver it to the desired point, substantially as described.

21. In a machine of the class described, the combination of a rotatable head provided with a series of holding-pockets and a series of radial slots, means for feeding a strip of paper adjacent to the head, means for feeding candy adjacent to the paper and one of the pockets, a cutter-plate arranged adjacent to the head, and a rotatable paper-cutter yieldingly mounted adjacent to the cutter-plate adapted to pass through the radial slots in the head and in contact with the cutter-plate for cutting the paper into pieces of the desired size, substantially as described.

22. In a machine of the class described, the combination of a rotatable head provided with a series of holding-pockets, means for feeding a strip of candy adjacent to each pocket in its respective order, and a rotatable involute cutter arranged adjacent to the head for cutting the strip of candy into pieces while the portion to be severed is in position adjacent to the pocket into which it is intended to be inserted, substantially as described.

23. In a machine of the class described, the combination of a rotatable head provided with a series of holding-pockets, means for feeding a strip of candy adjacent to each pocket in its respective order, means for feeding a strip of paper adjacent to the candy, means for forcing a piece of the candy and a portion of the paper into a pocket, means for cutting the paper into pieces of the desired size and a blade adjacent to the rotatable head for cutting the candy into pieces, substantially as described.

24. In a machine of the class described, the combination of a rotatable head provided with a series of holding-pockets, means for feeding a strip of a paper adjacent to each pocket in its respective order, means for feeding a piece of candy adjacent to the paper, means for forcing the piece of candy with a portion of the paper into the pocket, and means for cutting the paper while such portion is in the pocket, substantially as described.

25. In a machine of the class described, the combination of a rotatable head provided with a series of holding-pockets, means for feeding a strip of candy adjacent to each pocket in its respective order, and means for cutting a piece of candy from the strip while the portion to be severed is in position adjacent to the pocket, substantially as described.

26. In a machine of the class described, the combination of a rotatable head provided with a series of holding-pockets, means for feeding a strip of paper adjacent to each pocket in its respective order, means for feeding a strip of candy adjacent to the same pocket, means for cutting a piece from the strip of candy while the portion to be severed is in position adjacent to the pocket, means for forcing the severed piece of candy and a portion of the paper into the pocket, means for cutting a piece from the strip of paper while a portion of such paper is in the pocket, and means for folding the paper around the pieces of candy while in the pockets, substantially as described.

27. In a machine of the class described, the combination of a rotatable head provided with a series of pockets in its periphery, means for feeding paper adjacent to each of the pockets in its order, means for forcing a piece of candy into each of such pockets with the paper, means for cutting off the paper, folding mechanism mounted adjacent to and separate from the head for folding the paper around the candy while in the head, and means for discharging the completed package out of the head, substantially as described.

HARRY Y. ARMSTRONG.

Witnesses:
THOMAS F. SHERIDAN,
HARRY IRWIN CROMER.